Patented Sept. 5, 1939

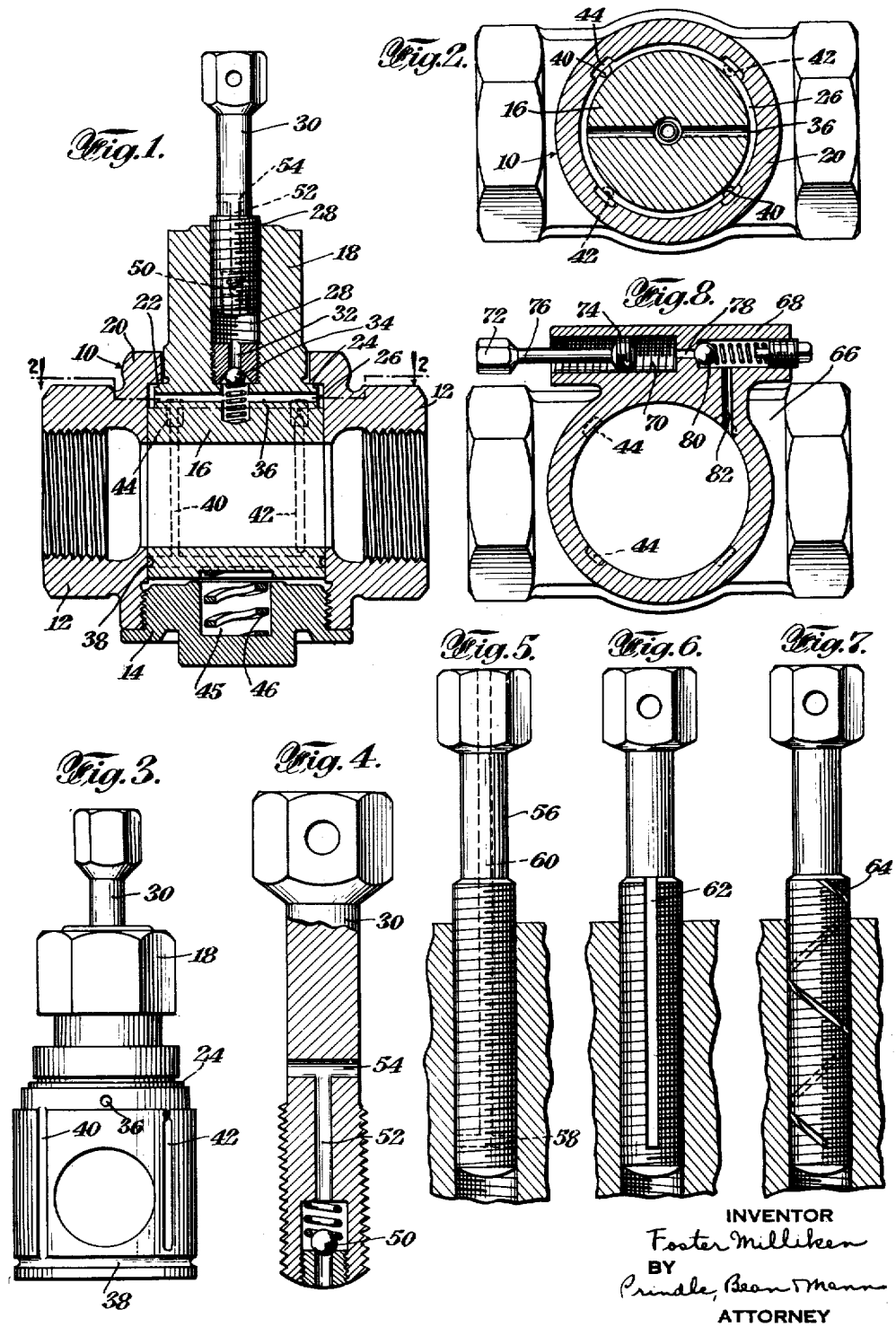

2,171,590

UNITED STATES PATENT OFFICE 2,171,590

LUBRICATED VALVE

Foster Milliken, Lawrence, N. Y.

Application February 29, 1936, Serial No. 66,375

10 Claims. (Cl. 184—38)

This invention relates to an improvement for use in connection with lubricated valves.

One of the problems in lubricated valves is the danger that in operation an undue lubricant pressure will be built up within the valve. This may cause the exudation of lubricant into the line, thereby affecting the fluid which is passing through the line or in some instances it may even exert an undue pressure on the valve body, bending or cracking the same.

This difficulty may in part be overcome by providing a shoulder at the top of the plug which bears against a corresponding shoulder on the body and providing a spring at the bottom of the plug to hold these two shoulders in contact. In such case if the lubricant is introduced at the top of the plug adjacent such shoulders and then is distributed from such point down over the face of the plug, an undue pressure of lubricant will tend to compress the bottom spring and allow the two top shoulders to separate and thereby permit lubricant to escape around the stem of the valve. This construction has many merits, and usually will serve to prevent actual breakage of the valve casing; however, I have found that it will not serve under all circumstances to eliminate the difficulty of having the lubricant forced across the face of the plug and into the line.

My invention relates to the application of an automatic device to a valve for preventing the building up of lubricant pressure in the valve beyond a predetermined pressure and which is used with a check valve to hold the predetermined pressure beyond the point where the check valve is applied. This I have termed balanced-predetermined lubricant pressure with sight feed, so that when the device is used where a predetermined pressure has been decided on, then the operator is powerless to build up a pressure greater than the predetermined pressure beyond the check valve. If the operator exerts too great a pressure on the lubricant it will be forced from the lubricant receptacle to the exterior of the lubricant receptacle and show that too great a pressure has been applied. My invention can be used in connection with any of the numerous forms of forced lubricant pressure such as for example, bearings (automobiles, machinery, etc.), ordinary lubricated plug cocks, gate valves, plug type lubricated valves, etc.

As a basis for the particular features of the present invention I supply the usual primary lubricant receptacle in which the lubricant is inserted and from which the lubricant is forced preferably through a check valve in a restricted opening into the lubricant ducts of the valve. The check-valve is provided between the lubricant receptacle and the lubricant ducts of the valve so as to prevent back pressure on the lubricant in the lubricant receptacle. The check valve permits passage of the lubricant in one direction but prevents any line pressure or surges in line pressure from forcing lubricant from the lubricant ducts back into the lubricant receptacle and then out of the lubricant receptacle.

According to my invention it is impossible to build up an undue pressure in this primary lubricant receptacle. By limiting the pressure at this point, it is obvious that no undue pressure can be built up beyond the passage connecting the lubricant receptacle with the valve ducts.

One manner in which the pressure may be released from the lubricant receptacle is to provide a check-valve in the pressure screw which is controlled by a spring stiff enough to permit the desired pressure to be built up in the lubricant receptacle but flexible enough so that it will open if an undue pressure is built up at this point. Such a device permits of ready adjustability as it is a simple matter to tighten such a spring or change the spring. However, I have found that approximately similar results can be attained by permitting the lubricant to work back along the threads of the pressure screw an appropriate distance and then emerge into an opening which ordinarily will be formed in the face of the pressure screw. The degree of pressure that can be built up in the chamber will depend upon the clearance between the threads of the screw and the cooperating threads surrounding the screw, as well as the distance along these threads which the lubricant must travel. In practice I have found that efficient results can be attained by cutting a chase or chases in the sides of the pressure screw and that the pressure to be built up in the lubricant receptacle can be varied by varying the distance between the end of the pressure screw and the end of such chase.

This invention is preferably used with the form of valve previously referred to in which an undue pressure will permit the valve plug to move downwardly so that an opening is made around the stem, but this is not essential and my invention may be used with many types of valves including the older types where head packing is required, or where lubricant is forced in at the bottom of the valve.

As regards the general construction of the valve, several modifications may be made without in any way departing from the spirit of the invention; for example, the valve may be made with the plug inserted from the top with the seating surface made on a separable part of the casing, or if preferred (and this is generally found to be the better practice) the seating surface may be made integral with the casing and provision made for removing the plug from the bottom. In like manner, the lubricant may either be introduced down through the stem of the plug or it may be introduced through the casing adjacent the top of the plug. Or the lubricant may be introduced adjacent the bottom of the plug. For the relief of excess lubricant pressures I may also use lubricant screws having check valves and passages leading from such check valves to the exterior of the lubricant receptacle, or lubricant screws having full and complete threads at one end and having passages of vertical ducts or chases cut into the threads of the screws extending from the full and complete threads to a point outside of the lubricant receptacle. In other forms the passages can be drilled in the screws. By varying the distance of the ends of these passages from the end of the screw, different predetermined pressures may be obtained in the pressure of the lubricant in the lubricant receptacle. I may also use a lubricant screw having a small number of screw threads at one end only with the rest of the lubricant screw reduced in diameter but unthreaded. Instead of straight, vertical chases I can also use spiral grooves or chases on the lubricant screws, the spirals beginning at a point above the end of the screw. The passages in the lubricant screws lead to the exterior of the lubricant receptacle and the escape of lubricant can be seen by the person applying the pressure to the lubricant and so serves as a visual indication.

My invention can readily be understood by reference to the accompanying drawing, in which Fig. 1 represents a vertical section of a valve embodying by invention, of a type where the lubricant is introduced through the stem of the plug;

Fig. 2 represents a horizontal section taken on line 2—2 of Fig. 1;

Fig. 3 represents a vertical elevation of the plug shown in Fig. 1 taken at right angles to the view of Fig. 1;

Fig. 4 represents an enlarged vertical section of the lubricant screw provided with a check valve;

Fig. 5 represents another form of my invention and shows an enlarged vertical section of a portion of a stem having a lubricant screw provided with an axial hole and a diametrically arranged hole near one end of the screw;

Fig. 6 represents another form of lubricant screw in a stem having a chase extending from adjacent one end of the screw;

Fig. 7 represents still another form of lubricant screw having a spiral chase; and Fig. 8 shows the casing construction of a modified form of valve where the lubricant is introduced in a horizontal direction through the casing.

Referring now to the drawing, the reference character 10 designates a hollow casing which in this case is provided with two screwed ends 12. This casing 10 has a bottom opening closed by a screw cover 14. The opening leads to the interior of the casing in which is located the valve plug 16 provided with an upwardly extending stem 18. Around the lower part of the stem 18 the casing 10 is provided with a ring shaped portion 20 on the underside of which is a seating surface 22. The plug 16 has a cooperating seating shoulder 24 (see Fig. 3) adapted to press against the seating surface 22 on portion 20. Immediately adjacent the contact of these two surfaces, the top portion of the plug is cut away to form a recess or lubricant duct 26.

The stem 18 has a central receptacle 28 for the introduction of lubricant, which is provided with a pressure screw 30. Lubricant from the receptacle 28 passes through the passage 32 past the check valve 34 into the horizontal passage 36 of plug 16 which passage extends to the lubricant duct or channel 26. Check valve 34 prevents back pressure from forcing lubricant from the grooves back into the lubricant receptacle and then from the valve housing as will be later pointed out in more detail.

In the embodiment of my invention here shown the plug 16 is formed with a circumferential lubricant duct 38 (see Fig. 3) near the bottom. Two vertical lubricant ducts 40 arranged in diametrically opposite positions extend from the lubricant duct 38 up to the lubricant duct 26. Another pair of shorter vertical lubricant ducts 42 is arranged diametrically opposite to each other in the plug but which do not quite connect with the top and bottom lubricant ducts 26 and 38. Supplementing the lubricant ducts 42, recesses 44 are formed in the casing (see Fig. 2) and are so positioned that when the valve is either in extreme open or closed position, the ducts 42 are connected through the recesses 44 to the lubricant ducts 26. If desired, similar supplemental recesses in the casing may be provided at the bottom to connect the lubricant ducts 42 with the lubricant duct 38. The operation and function of these grooves is more fully explained in Milliken Patent No. 1,915,068 where a similar arrangement is shown except that in that patent the vertical ducts are shown formed in the body and the casing and the recesses are shown formed in the plug. Such reversal of parts is obvious and either arrangement may be employed.

The bottom cover 14 screws into the casing 10 to form a tight fit therewith and preferably leaves a slight clearance between its upper face and the lower face of the plug 16. This bottom cover is preferably formed with a recess 45, and supports a spring 46 which presses the plug upwardly so that seating shoulder 24 will be kept pressed against seating surface 22.

As shown in Figs. 1 and 4 the pressure screw 30 has a check valve 50 which opens into the vertical passageway 52 in the plug which communicates with horizontal passageway 54. The passageway 54 is positioned above stem 18 of the plug. The check valve 50 is adapted to open when an excessive pressure is reached in the lubricant in the lubricant receptacle to permit escape of lubricant through passageways 52 and 54 where the lubricant may be seen. The check valve 50 provides a means of relieving excess pressure from the lubricant receptacle.

In Figs. 5, 6 and 7 I have shown other forms of lubricating screws which are used to relieve excessive lubricant pressures. In Fig. 5 the pressure screw 56 has a horizontal hole 58 through the screw near the lower end thereof. Communicating with this hole is a vertical axial hole 60 of the screw and extending to its outer end. When the screw is rotated and screwed down to exert pressure on the lubricant, the threads on the lower end of the screw between hole 58 and the lower end of the screw will hold a pressure up to a predetermined amount and then beyond this pressure the lubricant will leak along the threads into the holes 58 and 60 to give a visual indication that too great a pressure has been applied. There is, as usual, some clearance between the thread of the lubricant screw and the threaded portion in the stem 18, and this clearance permits escape of lubricant when the lubricant is put under sufficient pressure. By varying the position of horizontal hole 58 with respect to the end of the lubricating screw, greater or smaller pressures in the lubricant can be obtained. In Fig. 6 the lubricating screw has a vertical chase or chases 62 cut through the threads from a point near the bottom of the screw. By varying the distance between the lower end of the chase or chases and the lower end of the screw, different pressures of lubricant can be obtained in the casing, that is, by varying the number of complete threads at the lower end of the pressure screw, it is possible to obtain different predetermined pressures in the lubricant receptacle of the valve. In Fig. 7 instead of using a straight chase, I have shown a spiral chase 64.

When the lubricant ducts and passages described are all filled with a thick, viscous lubricant and the parts assembled as shown in Fig. 1, leakage at the head is prevented due to the fact that the plug 16 will be held with shoulder 24 pressed against the seating surface 22 of portion 20, thereby preventing the escape of lubricant from the lubricant duct 26. The relief device around or in connection with the lubricant screw will normally function to relieve any pressure above that desired in the lubricant receptacle by releasing lubricant directly from the lubricant receptacle so that no damage will result or no lubricant is forced into the line. If the lubricant pressure in the lubricant receptacle builds up momentarily for any reason as by turning the lubricant screw too fast, the plug may be slightly depressed so that spring 46 is compressed with the result that there will be a space between seating shoulder 24 and seating surface 22 and the excess lubricant will escape up around the stem. However, with my device this function is relatively unimportant and spring 46 may be made comparatively stiff to prevent head leaks.

In Fig. 8 the casing 66 is shown as having an integral side lug 68 in which is formed a lubricant receptacle 70 provided with a pressure screw 72. This screw 72 is formed with a small number of full threads 74 at the bottom instead of a much larger number and an unthreaded portion at 76. By having a number of full threads at the bottom, a predetermined pressure cannot be exceeded because the lubricant, if subjected to undue pressure will travel along the threads and escape to the exterior of the lubricant receptacle to give a visual indication that too much pressure has been applied. By varying the number of threads the maximum pressure within the lubricant receptacle can be varied. The pressure screw may be any one of the pressure screws shown in Figs. 1, 4, 5, 6 and 7 instead of the one shown at 72. When pressure is exerted on the lubricant in the lubricant receptacle, the lubricant passes through passage 78, past the check valve 80 into horizontal passage 82 from which the lubricant enters a circumferential duct formed between the plug and the casing corresponding directly with the lubricant duct or channel 26 already described in connection with Fig. 1. In other respects the construction of the two forms of valve are identical except that the plug will not have internal lubricant passages.

In the forms shown in the drawing there is a check valve in the passage beyond the lubricant receptacle, and such check valve prevents any back pressure such as is created, for example, by a momentary increase in the line pressure, from exerting a pressure on the lubricant in the lubricant receptacle and forcing it or blowing it out of the receptacle. The lubricant is forced past the check valve into the ducts but this check valve prevents return of the lubricant into the lubricant receptacle.

It is to be understood that the foregoing examples are given only by way of illustration and that the same may be modified in many particulars without departing from the spirit of my invention.

What I claim is:

1. A pressure screw adapted for use in lubricated valves to exert pressure on a lubricant in a lubricant receptacle and including means for relieving excessive pressure of the lubricant and for conducting excess lubricant to the outside of the valve.

2. A pressure lubricating screw for use in lubricated valves for exerting pressure on a lubricant in the valves and including complete threads at one end and a chase leading from said complete threads to a point near the other end of the lubricating screw.

3. A device provided with a lubricant receptacle, a lubricant passage leading from said receptacle and a check valve between said receptacle and said passage, and including a plurality of parts in threaded engagement, said parts being threaded one within the other and movable relatively to each other to contract said lubricant receptacle and normally force lubricant therefrom past said check valve into said lubricant passage, said inner threaded part being provided with means for relieving excessive lubricant pressures directly from said lubricant receptacle before the lubricant moves past said check valve.

4. A device provided with a lubricant receptacle and a check valve between said receptacle and said passage, and including a plurality of parts in threaded engagement, said parts being threaded one within the other and movable relatively to each other to contract said lubricant receptacle and normally force lubricant therefrom into said lubricant passage under a desirable pressure to a part to be lubricated, said inner threaded part having complete threads at its one end and a chase leading from said complete threads to a point near the other end thereof for releasing excessive pressures directly from said lubricant receptacle.

5. A device provided with a lubricant receptacle, a lubricant passage leading from said receptacle and a check valve between said receptacle and said passage, and including a plurality of parts in threaded engagement and being threaded one within the other, said parts being relatively movable to normally force lubricant from said lubricant receptacle past said check valve into said lubricant passage, one of said parts being provided with means for relieving excessive lubricant pressures directly from said lubricant receptacle before the lubricant moves past said check valve into said lubricant passage such means being so constructed and arranged that when the lubricant pressure in the lubricant receptacle exceeds a predetermined value, lubricant can escape from the system and give a visual indication that the desired lubricant pressure has been exceeded.

6. In a lubricating valve, a lubricant receptacle, a passage leading from said receptacle to conduct lubricant to lubricate said valve, a check valve between said receptacle and said passage, a screw threaded to enter said receptacle so arranged that if said screw is screwed inwardly, the area of said receptacle will be contracted to build up a lubricant pressure in said receptacle normally to force lubricant from said lubricant chamber past said check valve into said lubricant passage, and means associated with said receptacle for relieving excess lubricant pressure directly from said receptacle before the lubricant moves past said check valve, such means being so constructed and arranged that when the lubricant pressure in the receptacle exceeds a predetermined value, lubricant can escape from the system to give a visual indication that the desired lubricant pressure in the receptacle has been exceeded.

7. A structure as specified in claim 6 in which the said means for relieving excess lubricant pressure is associated with the said screw which is used for developing lubricant pressure.

8. A structure as specified in claim 6, in which the said means for reducing excess lubricant pressure comprises a passage formed by reducing a portion of the said screw used for developing the lubricant pressure so that lubricant can escape along the threads of said screw into such passage.

9. In a lubricated valve, a lubricant receptacle, means to build up lubricant pressure in said lubricant receptacle, a valve plug and body having lubricant channels for the lubrication of the valve, means to conduct lubricant under pressure from the lubricant receptacle into the lubricant channels of the valve plug and body, means to prevent the return of the lubricant under pressure after it has passed into the lubricant channels of the valve plug and body, and means to release lubricant pressure exceeding a predetermined point directly from the lubricant receptacle in which the lubricant pressure is built up.

10. In a lubricated valve, a lubricant receptacle, a valve plug and body having lubricant channels, a passageway connecting said lubricant receptacle and said lubricant channels, means to prevent the return of lubricant under pressure after it has passed into the lubricant channels of the valve plug and body, means to build up lubricant pressure in the lubricant receptacle and means in the lubricant receptacle to release lubricant pressure directly from the lubricant receptacle when the lubricant pressure in the lubricant receptacle exceeds a predetermined point.

FOSTER MILLIKEN.

CERTIFICATE OF CORRECTION.

Patent No. 2,171,590. September 5, 1939.

FOSTER MILLIKEN.

It is hereby certified that error appears in the printed specification of the above numbered patent requiring correction as follows: Page 2, first column, line 20, for the word "of" read or; line 44, for "by" read my; page 3, second column, line 49, claim 4, strike out the syllable "tacle" and insert instead and a lubricant passage leading from said receptacle; line 64, claim 5, for "sadi" read said; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.

that when the lubricant pressure in the lubricant receptacle exceeds a predetermined value, lubricant can escape from the system and give a visual indication that the desired lubricant pressure has been exceeded.

6. In a lubricating valve, a lubricant receptacle, a passage leading from said receptacle to conduct lubricant to lubricate said valve, a check valve between said receptacle and said passage, a screw threaded to enter said receptacle so arranged that if said screw is screwed inwardly, the area of said receptacle will be contracted to build up a lubricant pressure in said receptacle normally to force lubricant from said lubricant chamber past said check valve into said lubricant passage, and means associated with said receptacle for relieving excess lubricant pressure directly from said receptacle before the lubricant moves past said check valve, such means being so constructed and arranged that when the lubricant pressure in the receptacle exceeds a predetermined value, lubricant can escape from the system to give a visual indication that the desired lubricant pressure in the receptacle has been exceeded.

7. A structure as specified in claim 6 in which the said means for relieving excess lubricant pressure is associated with the said screw which is used for developing lubricant pressure.

8. A structure as specified in claim 6, in which the said means for reducing excess lubricant pressure comprises a passage formed by reducing a portion of the said screw used for developing the lubricant pressure so that lubricant can escape along the threads of said screw into such passage.

9. In a lubricated valve, a lubricant receptacle, means to build up lubricant pressure in said lubricant receptacle, a valve plug and body having lubricant channels for the lubrication of the valve, means to conduct lubricant under pressure from the lubricant receptacle into the lubricant channels of the valve plug and body, means to prevent the return of the lubricant under pressure after it has passed into the lubricant channels of the valve plug and body, and means to release lubricant pressure exceeding a predetermined point directly from the lubricant receptacle in which the lubricant pressure is built up.

10. In a lubricated valve, a lubricant receptacle, a valve plug and body having lubricant channels, a passageway connecting said lubricant receptacle and said lubricant channels, means to prevent the return of lubricant under pressure after it has passed into the lubricant channels of the valve plug and body, means to build up lubricant pressure in the lubricant receptacle and means in the lubricant receptacle to release lubricant pressure directly from the lubricant receptacle when the lubricant pressure in the lubricant receptacle exceeds a predetermined point.

FOSTER MILLIKEN.

---

CERTIFICATE OF CORRECTION.

Patent No. 2,171,590.              September 5, 1939.

FOSTER MILLIKEN.

It is hereby certified that error appears in the printed specification of the above numbered patent requiring correction as follows: Page 2, first column, line 20, for the word "of" read or; line 44, for "by" read my; page 3, second column, line 49, claim 4, strike out the syllable "tacle" and insert instead and a lubricant passage leading from said receptacle; line 64, claim 5, for "sadi" read said; and that the said Letters Patent should be read with this correction therein that the same may conform to the record of the case in the Patent Office.

Signed and sealed this 3rd day of October, A. D. 1939.

(Seal)                            Henry Van Arsdale,
                                         Acting Commissioner of Patents.